May 17, 1932.  C. J. CHEVRE  1,858,818
AUTOMOBILE SIGNAL
Filed Aug. 14, 1931
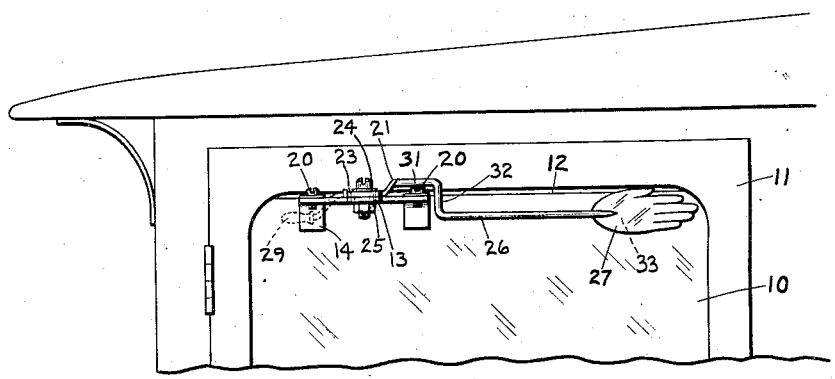
Fig.1
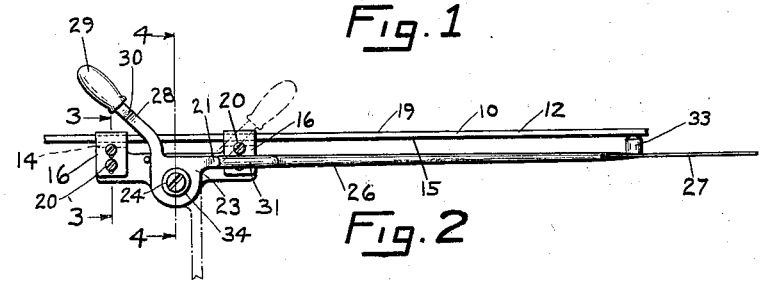
Fig.2
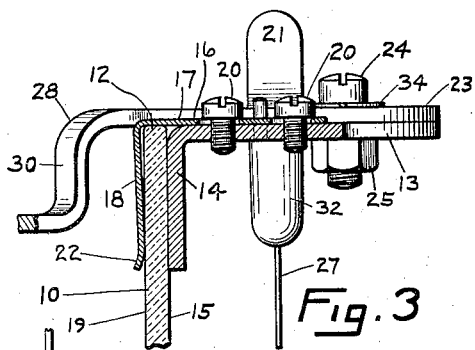
Fig.3
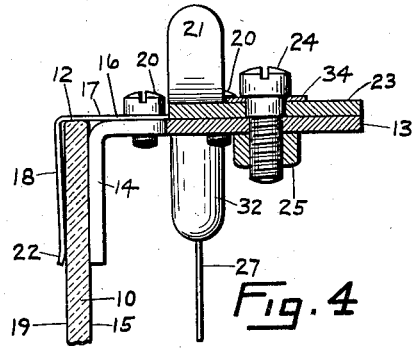
Fig.4
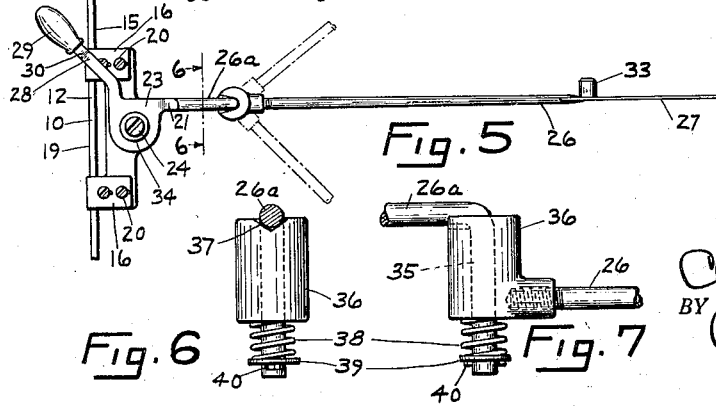
Fig.5
Fig.6
Fig.7
INVENTOR.
BY
ATTORNEY Patented May 17, 1932

1,858,818

UNITED STATES PATENT OFFICE

CHARLES J. CHEVRE, OF FAIRFIELD, CONNECTICUT

AUTOMOBILE SIGNAL

Application filed August 14, 1931. Serial No. 556,998.

This invention relates to stopping and turning signals for motor vehicles.

An object of the present invention is to provide a signal device secured directly to the upper edge of the glass window adjacent the driver's seat in a closed car and so arranged that it may be operated from the interior of the car whether the window is substantially closed or whether it is open.

Another object of this invention is to provide a signal device of the kind referred to, which is extremely simple, containing a minimum number of parts and is easily applied to the window and easily operated.

Devices of the kind referred to have been heretofore proposed, but these have been unsatisfactory for several reasons. In some cases they require considerable work in installing them and in other cases they involve complicated movements and relatively large number of parts. In still other cases they do not permit the window to be substantially closed without necessitating the removal of the device therefrom.

In the device of the present invention there are a few simple and easily made parts so disposed as to permit the window to be substantially closed while the device remains in operative position on the upper edge thereof, and yet which is easily and quickly operated.

Other features and advantages will hereinafter appear.

In the accompanying drawings which illustrate the preferred form of the present invention:—

Figure 1 is a side view of the upper forward part of a closed automobile showing the device of the present invention supported on the window, the window being substantially closed.

Fig. 2 is a top plan view of the device of the present invention showing it applied to a window.

Fig. 3 is a sectional view taken on the line 3—3, Fig. 2.

Fig. 4 is a sectional view taken on the line 4—4, Fig. 2.

Fig. 5 is a plan view of the modified form of this invention.

Fig. 6 is a sectional view taken on the line 6—6, of Fig. 5, and showing the yielding connection between the lever and the signal arm.

Fig. 7 is a side view showing the connection whereby the signal arm may yield relative to the lever.

In operating motor vehicles, particularly pleasure cars of the closed type, it is unsafe to drive with the window next to the driver closed, because the usual hand signal can not then be given to indicate that the driver is intending to stop or to make a turn. Accordingly, in inclement weather the operator must choose between getting wet or chilled, or risk driving with the window closed.

Heretofore efforts have been made to provide a signal device supported on the window of a closed motor vehicle, but as yet no device of this kind has been placed on the market where it is available to the public. This may be because the devices heretofore proposed are complicated and hence expensive to make, or because they require special installation and can not be readily placed on the car by the ordinary purchaser, or because they do not permit of the window being always entirely closed, or because they are not firmly enough attached to the window to remain thereon in spite of the jars and jolts which motor vehicles are subjected to when the window is partially opened.

These difficulties are obviated by the present invention which is simple and compact, easily installed and operated, and firmly and surely supported on the window.

In the accompanying drawings the device is shown as applied to the window 10 in the door 11 adjacent the operator's seat. The window 10 is as usual mounted to slide in suitable guideways so that it may be open and closed, and as usual has an unbound upper edge 12.

The device of the present invention comprises a simple supporting plate 13 for the most part extending horizontally. At each end it has a downwardly extending arm 14 bent at right angles to it. These arms 14 engage the outer surface 15 of the window 10. The plate 13 is also provided with a pair of clamping jaws 16 having horizontal portions 17 extending beyond the arms 14 of the plate 13 so as to engage over the upper edge 12 of the window, and vertical portions 18 adapted to engage the inner surface 19 of the window 10.

The clamping jaws 16 are secured to the plate 13 by screws 20 extending through suitable elongated slots in the horizontal portions 17 to permit an adjustment of the jaws to accommodate window panes 10 of different thicknesses. The angularity of the vertical portion 18 relative to the horizontal portion 17 of the clamping jaw is such that the lower end 22 of the arm 18 engages the glass and further movement of the jaws 16 horizontally and outwardly causes the arms 18 to be placed under tension, at the same time firmly gripping the glass 10 between themselves and the vertical arms 14 of the plate 13.

With this firm support no rubber or friction-producing material need be inserted between the jaws and the glass for the resiliency of the jaw 16 is sufficient to hold the device to the glass against the usual vibrations and jolts imparted to the glass while operating the vehicle.

On the other supporting plate 13 there is supported a lever 23. This lever is pivotally secured to the plate 13 by a shouldered screw 24 and nut 25. Connected to the lever 23 at one side is a rod 26 carrying at its outer extremity a hand, disk or other signal device 27 while at the other side of the screw 24 the lever 23 has an extension 28 provided with a handle 29. The extension 28 reaches over the edge 12 of the glass to the interior of the vehicle where it has a downwardly bent portion 30 which lowers the level of the handle 28 sufficiently below the ceiling of the car to permit the handle to be easily operated.

The arm 26 carrying a hand 27 has a portion 31 bent upwardly at 21 to pass over the screws 20 and another portion 32 bent downwardly so that the hand 27 in returning to inoperative position will engage the glass rather than the frame of the door 11. For the purpose of protecting the glass against damage by the hand, the latter is preferably provided with a rubber bumper 33.

Normally the signal device is in the position shown in Fig. 1 close to the car. When it is desired to signal a car approaching from the rear, the handle 29 is pulled toward him by the operator and this causes the lever 23 to swing around its pivot on the shoulder of the screw 24 until the hand reaches the desired position. In congested traffic where the cars may be very close to each other, the operator will not want to swing the hand out all the way for fear of hitting an adjacent car, and according to the present invention he may swing the hand out as little or much as desired. When the signal is no longer intended to be given, the hand 27 is returned to position against the glass 10 by the operator pushing the handle 29 away from him.

In order to hold the hand in desired adjusted position without placing too great a resistance on its operating movement, a spring washer 34 is interposed between the head of the screw 24 and the lever 23 carrying the hand 27 and handle 29.

The lever 23, rod 26, screw 24, and screws 20 are all so located on the plate 13 as to be out of contact with the door frame of the car and to the exterior of the window 10 so as not to interfere with the closing of the window. The jaws 16 of the clamps and the extension 28 on the lever 23 are the only things extending over the window pane 10 and the latter may be closed until the extension 28 is about to engage the window frame. Hence, with the device of this invention, the window may be substantially closed while yet keeping the device in operation.

With the form of the invention shown in Figs. 1 to 4, should the signal arm meet with an obstruction when moving or when in operative position, the blow it receives might cause the window pane to be broken or, if this does not happen, an adjacent car or other object and person being struck might be damaged or injured. To avoid this, in the form of the invention shown in Figs. 5 to 7, a yielding connection is provided between the lever 23 and the signal arm 26 which forms an extension of the lever 23.

This yielding connection is provided by bending the rod 26a downwardly to provide a vertical shaft 35 and the signal arm 26 is provided with a hub 36 mounted on the vertical shaft 35. The upper surface of the hub 36 is provided with a V-shaped notch 37 in which the rod 26a normally lies, the hub 36 being urged upwardly by a spring 38 located between the hub and a washer 39 overlying a cotter pin 40 extending through the lower end of the vertical shaft 35.

Accordingly, the signal arm 26 and rod 26a move in unison under normal conditions. Should, however, the signal arm meet with an obstruction while the lever 23 is being operated to make the signal effective, the hub 36 will be cammed downwardly out of the notch and will be free to remain stationary while the lever 23 continues to move. In the same way if the lever 23 should be in operative position with the signal arm 26 projecting out from the car and some object or person be standing beside the car while it is moving, the signal arm 26 may swing back without seriously injuring or damaging the person or object which is struck. The flexible connection provided by this invention permits a movement of the signal arm in both directions from normal operative position, and hence should a car be passing the one giving the signal, or should the driver of the car be backing-up when an obstruction is met, the signal arm may yield forwardly without doing serious damage and certainly without breaking the window pane 10 on which it is mounted. The signal arm 26 is yieldingly held to the rod 26a with sufficient force to avoid the signal arm being bent back by the wind when in operative position.

Other forms of yielding connections may be provided within the scope of this invention and other variations and modifications may be made and portions of the improvements may be used without others.

Having thus described the invention, what is claimed as new and for which it is desired to obtain Letters Patent, is:—

1. An automobile signal device comprising a plate, a pair of arms bent downwardly from the plate and adapted to lie against the outside face of the window pane of the door adjacent the driver's seat, a pair of jaws having horizontal portions slidably mounted on said plate adapted to extend over the upper edge of the window pane and vertical portions adapted to lie against the inner face of the window pane and clamp the pane on the plate, screws for securing the jaws in adjusted position, a lever pivoted on said plate for movement in a horizontal plane, an extension on said lever carrying a signal arm, and another extension on said lever reaching over the upper edge of said window pane to the interior of the automobile and there provided with a handle by means of which the signal may be swung from inoperative to operative position and vice versa.

2. An automobile signal device comprising a plate, a pair of arms bent downwardly from the plate and adapted to lie against the outside face of the window pane of the door adjacent the driver's seat, a pair of jaws having horizontal portions slidably mounted on said plate adapted to extend over the upper edge of the window pane and vertical portions adapted to lie against the inner face of the window pane and clamp the pane on the plate, screws for securing the jaws in adjusted position, a lever pivoted on said plate for movement in the horizontal plane from inoperative to operative positions and vice versa, said lever having an extension carrying a signal and said extension having a double bend offsetting the signal downwardly to avoid the striking of the door frame by the signal when returning to inoperative position.

3. An automobile signal device comprising a plate, a pair of arms bent downwardly from the plate and adapted to lie against the outside face of the window pane of the door adjacent the driver's seat, a pair of jaws having horizontal portions slidably mounted on said plate adapted to extend over the upper edge of the window pane and vertical portions adapted to lie against the inner face of the window pane and clamp the pane on the plate, screws for securing the jaws in adjusted position, and a signal lever pivotally mounted on said plate for movement in a horizontal plane from inoperative to operative position and vice versa.

4. An automobile signal device comprising a plate having downwardly bent portions adapted to lie against one face of the window pane in the door adjacent the driver's seat, horizontally adjustable jaws mounted on said plate and adapted to engage the other face of the window pane, and a signal lever pivotally mounted on said plate for movement in a horizontal plane from operative to inoperative positions and vice versa.

5. An automobile signal device comprising a plate having means for clamping it to the upper edge of the window pane of the door adjacent the driver's seat, a lever mounted on said plate extending into the automobile to be manually moved in a horizontal plane from inoperative to operative positions and vice versa, a signal arm pivotally mounted on said lever, and a connection between the lever and the signal arm adapted to yield upon meeting with an obstruction when the signal arm is being moved or is in operative position.

6. An automobile signal device comprising a plate having means for clamping it to the upper edge of the window pane of the door adjacent the driver's seat, a lever mounted on said plate extending into the automobile to be manually moved in a horizontal plane from inoperative to operative positions and vice versa, a signal arm pivotally mounted on said lever, and means permitting the signal arm to yield upon meeting an obstruction when the signal arm is moved or is in operative position.

7. An automobile signal device comprising a plate having means for clamping it to the upper edge of the window pane of the door adjacent the driver's seat, a lever mounted on said plate extending into the automobile to be manually moved in a horizontal plane from inoperative to operative positions and vice versa, a signal arm pivotally mounted on said lever, and means permitting the signal arm to yield upon meeting an obstruction when the signal arm is moved or is in operative position, said means permitting the signal arm to yield both forwardly and backwardly.

8. An automobile signal device comprising a plate having means for clamping it to the upper edge of the window pane of the door adjacent the driver's seat, a lever mounted on said plate extending into the automobile to be manually moved in a horizontal plane from inoperative to operative positions and vice versa, said lever terminating in a rod bent downwardly, a hub pivotally mounted on the downwardly bent portion of the rod, a signal arm carrying the hub, a V-shaped notch in the hub engaging a horizontal portion of the rod, and spring means urging the hub upwardly and permitting the hub to yield downwardly and move horizontally relatively to the rod when the signal arm meets with an obstruction while the lever is moving or is in operative position.

Signed at Bridgeport, in the county of Fairfield and State of Connecticut, this 11th day of August, 1931.

CHARLES J. CHEVRE.